(12) United States Patent
Chahal et al.

(10) Patent No.: US 9,588,901 B2
(45) Date of Patent: Mar. 7, 2017

(54) CACHING AND TIERING FOR CLOUD STORAGE

(71) Applicant: Intel Corporation, Santa Clara, CA (US)

(72) Inventors: Sudip Chahal, Gold River, CA (US); Husni Bahra, Folsom, CA (US); Nigel Wayman, Clane (IE); Terry Yoshii, Folsom, CA (US); Charles Lockwood, Beaverton, OR (US); Shane Healy, Celbridge (IE)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 14/670,574

(22) Filed: Mar. 27, 2015

(65) Prior Publication Data

US 2016/0283394 A1 Sep. 29, 2016

(51) Int. Cl.
- *G06F 12/04* (2006.01)
- *G06F 12/08* (2016.01)
- *G06F 3/06* (2006.01)

(52) U.S. Cl.
CPC .......... *G06F 12/0897* (2013.01); *G06F 3/061* (2013.01); *G06F 3/0604* (2013.01); *G06F 3/0631* (2013.01); *G06F 3/0649* (2013.01); *G06F 3/0671* (2013.01); *G06F 3/0683* (2013.01); *G06F 3/0685* (2013.01); *G06F 12/0871* (2013.01); *G06F 2212/603* (2013.01); *G06F 2212/604* (2013.01)

(58) Field of Classification Search
CPC .......... G06F 12/00; G06F 12/04; G06F 12/08; G06F 12/0804; G06F 12/0806; G06F 12/0811; G06F 12/0815; G06F 12/0817
USPC ................ 711/100, 117, 118, 141, 154, 170
See application file for complete search history.

(56) References Cited

U.S. PATENT DOCUMENTS

| | | | | |
|---|---|---|---|---|
| 2009/0265507 | A1* | 10/2009 | Jibbe | G06F 12/0866 711/103 |
| 2011/0055458 | A1* | 3/2011 | Kuehne | G06F 12/0246 711/103 |
| 2011/0145489 | A1* | 6/2011 | Yu | G06F 3/0613 711/103 |

(Continued)

FOREIGN PATENT DOCUMENTS

EP 2026188 A2 2/2009

OTHER PUBLICATIONS

"European Application Serial No. 16154709.6, Extended European Search Report mailed Jul. 6, 2016", 8 pgs.

(Continued)

*Primary Examiner* — Tuan Thai
(74) *Attorney, Agent, or Firm* — Schwegman Lundberg & Woessner, P.A.

(57) ABSTRACT

Various systems and methods for caching and tiering in cloud storage are described herein. A system for managing storage allocation comprises a storage device management system to maintain an access history of a plurality of storage blocks of solid state drives (SSDs) managed by the storage device management system; and automatically configure each of a plurality of storage blocks to operate in cache mode or tier mode, wherein a ratio of storage blocks operating in cache mode and storage blocks operating in tier mode is based on the access history.

25 Claims, 6 Drawing Sheets

(56) References Cited

U.S. PATENT DOCUMENTS

2013/0111474 A1* 5/2013 Agarwal ............. G06F 9/45558
  718/1
2013/0318196 A1 11/2013 Yamamoto et al.

OTHER PUBLICATIONS

"Canadian Application Serial No. 2,919,943, Office Action mailed Nov. 1, 2016", 3 pgs.
"European Application Serial No. 16154709.6, Response filed Oct. 25, 2016 to Extended European Search Report mailed Jul. 6, 2016", 19 pgs.

* cited by examiner

CACHING AND TIERING FOR CLOUD STORAGE

TECHNICAL FIELD

Embodiments described herein generally relate to storage device management and in particular, to caching and tiering for cloud storage.

BACKGROUND

A solid-state drive (SSD) is a data storage device that uses integrated circuit assemblies as memory to store data persistently. SSD drives use interfaces compatible with traditional block input/output (I/O) hard disk drives (HHD), which provides backward compatibility and simple replacement in various applications. Most SSDs use NAND-based flash memory, which retains data without power. SSDs have been incorporated into storage arrays as a cache mechanism. SSDs may also be used for storage. Current implementations of SSDs for storage and caches involves managing both independently. The SSDs may be allocated from a pool of devices. As such, there is a limited number of SSDs available for storage or cache.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide caching and tiering for cloud storage. In cloud storage, a combination of HHDs and SSDs may be used. For top tier service, SSDs may be used as the primary storage mechanism, where lower tier services provide HHDs for storage. In addition, SSDs may be used as caches between either SSD-based top-tier services or HDD-based lower-tier services.

Current implementations of SSDs for storage and cache involves managing both independently. The SSDs may be allocated from a pool of devices. As such, there is a limited number of SSDs available for storage or cache. Administrators typically guess at anticipated I/O patterns based on the contents stored, user base, or other aspects, and then add in some margin of error when allocating the SSD pool for either storage or cache. Once the allocation is committed, there is no simple way to reassign solid state capacity to either the storage or cache operations. Instead, reassignment typically involves reconfiguring the storage subsystem, which may entail downtime, negotiation with customers, and storage administrator resources. Consequently, the storage service owner may size the overall SSD pool more conservatively to meet the anticipated demand for Input/Output Operations per Second (IOPS), resulting in a higher overall solution cost. Additionally, today's storage designs tend to share consolidated caching resources across several storage pools, resulting in I/O contention across the pools.

Storage pools usually include multiple tiers of devices. A device tier refers to a collection of similar or same devices or device types, which provide approximately equivalent performance. Device tiers are conventionally organized based on the rough description of devices, such as by disk size (e.g., 500 GB, 1 TB, and 2 TB drives organized into separate tiers) or by disk rotation speeds (e.g., 7.2K rpm and 10K rpm drives organized into separate tiers) or by some combination of drive capacity and rotation speed.

The mechanisms described herein discuss an adaptive integrated solid state caching and tiering performed dynamically and automatically to allocate SSD capacity between cache mode and tier mode (storage mode). This may enable the storage capacity manager to optimize the overall solid state storage pool size, resulting in reduce acquisition costs and configuration management overhead. Additionally, the manager may allocate overall solid state storage capacity on a per pool basis for both tier and cache, thereby eliminating cross-pool contention and associated sizing complexity. Drives may also be organized into dynamic tiers, such that when a drive is added to a storage pool, the drive is added to an existing tier or added to a newly created tier based on the IOPS density of the drive. This type of management results in lower storage acquisition and ongoing support costs, simplified configuration management, and increased performance of storage systems.

Figure 1:
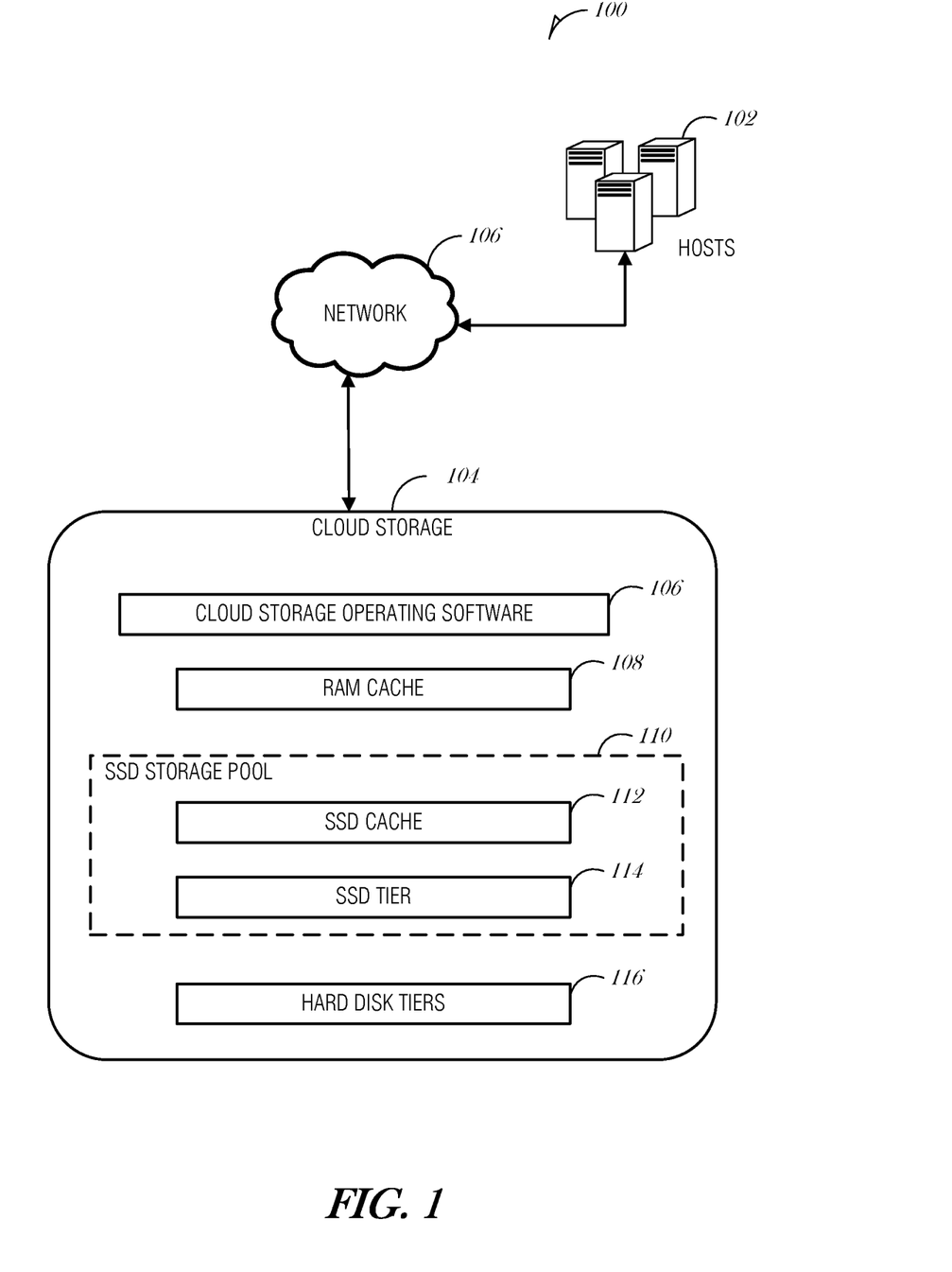
FIG. 1 is a schematic drawing illustrating a computing environment for caching and tiering in cloud storage, according to an embodiment.

FIG. 1 is a schematic drawing illustrating a computing environment 100 for caching and tiering in cloud storage, according to an embodiment. The computing environment 100 includes a number of hosts 102 and a cloud storage system 104, which are communicatively coupled via a network 106. A host 102 may be a device such as a smartphone, cellular telephone, mobile phone, laptop computer, tablet computer, music player, wearable device (e.g., watch, glasses-based device, etc.), desktop, laptop, hybrid, in-wall, or other networked device.

The network 106 may include local-area networks (LAN), wide-area networks (WAN), wireless variant networks (e.g., wireless LAN (WLAN) such as a network conforming to an IEEE 802.11 family of standards or a wireless WAN (WWAN) such as a cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices in FIG. 1 (e.g., hosts 102) may be coupled to the network 106 via one or more wired or wireless connections.

The cloud storage system 104 includes cloud storage operating software 106 that manages a random-access memory (RAM) cache 108, an SSD storage pool 110, which includes SSDs that operate as an SSD cache 112 and as an SSD tier 114, and hard disk tiers 116. The disk tiers (e.g., SSD tier 114 and hard disk tiers 116) are roughly organized according to disk performance. In many implementations, SSD tiers are at the top of the tier hierarchy with conventional magnetic disk drives occupying the middle and lower tiers in the tier hierarchy. The middle tiers are conventionally referred to as the performance tiers and may include Serial Attached SCSI (SAS) drives. The lower tiers are conventionally referred to as the capacity tiers and may include Near Line SAS (NL-SAS) or Serial ATA (SATA) drives, which are slower performers with larger capacities. SAS disks have largely replaced older SCSI disks to become the standard in enterprise-grade storage. Of the three types of disks (SAS, NL-SAS, and SATA), SAS are the most reliable, maintain their performance, and perform better than NL-SAS and SATA disks. SAS disks are tested to perform reliably in a near 100% duty cycle, whereas NL-SAS and SATA disks are designed and tested to perform at much lower levels of duty.

At the top of the tier hierarchy is the SSD tier 114, which includes disks from the SSD storage pool 110. The SSD storage pool 110 is partitioned into the SSD cache 112 and the SSD tier 114. The SSD cache 112 size is conventionally configured manually by an administrator who makes a rough estimate of anticipated input/output (I/O) patterns and demands. Once sized, there is no simply way to reassign solid state capacity. In the embodiment illustrated in FIG. 1, the cloud storage operating software 106 may dynamically partition the solid state storage capacity between caching and tiering functions, which provides significantly more cost-effective storage pool configurations compared to manual sizing.

The cloud storage operating software 106 may be configured to monitor usage of the SSD storage pool 110. Blocks being accessed on a sustained and continuing basis with a frequency above an access consistency threshold may be marked as tiered, in which case the primary copy is migrated to reside in the solid state tier 114. In this way, these tiered blocks no longer need to be periodically flushed to the much lower hard disk-based storage tiers 116, thereby conserving the relatively scarce IOPS and bandwidth of the much slower hard disks. Conversely, blocks whose access patterns fall below an access consistency threshold may be marked to be in a cached mode and stored in the SSD cache 112, with a primary copy being retained on a hard disk tier 116. Cached blocks are susceptible to be flushed or overwritten based on standard caching algorithms in response to changing access patterns. These caching algorithms allow the capacity of the SSD cache 112 to be serially shared among blocks with significant time varying access patterns at the cost (in terms of hard disk IOPS and bandwidth) of periodically updating the copy on the hard disk tier 116.

The relative size of the SSD cache 112 and tier 114 capacities may be dynamically adjusted using machine learning algorithms based on summary information regarding block access patterns. Specifically, for each block, an average accesses (reads and writes) per day is tracked and a measure of variability in the access patterns is determined Blocks with a relatively high variability indicate bursty or intermittent access, which is suitable for caching. Blocks with a relatively low variability indicate a steady access pattern, which is more suitable for tiering. For greater temporal resolution, variability may be measured at smaller intervals, such as hourly or less. In an embodiment, to measure access pattern variability of a block, a ratio of an average number of accesses divided by a standard deviation in accesses may be used. In another embodiment, time between accesses may be used to determine access pattern variability.

For example, in a given period (e.g., a day), the number of accesses of a block may be sampled multiple times (e.g., every minute). The result is then averaged over the period to provide an average number of accesses. A standard deviation may be calculated for the period (e.g., over the day with 1440 samples). A relatively low standard deviation may represent a relatively consistent access pattern and conversely, a relatively high standard deviation may represent a relatively volatile or bursty access pattern. The standard deviation may be scaled by the average and the result may be used as an access consistency metric.

As another example, in a given period of a day, the time between accesses may be measured and an average time between accesses may be calculated for multiple sub-periods (e.g., every minute). A standard deviation of the average time between accesses over the day may be calculated with respect to the 1440 samples (per minute averages). Similar to the previous example, a relatively low standard deviation may represent a consistent access pattern and vice versa.

Access consistency metrics may be calculated for every data block in the cloud storage system 104. In this manner, if a data block is initially stored in the hard disk tier 116 and then moved to the SSD cache 112 when requested by a host 102, the data block access is tracked. If later, the data block is flushed from SSD cache 112 because it was not accessed and the SSD cache 112 space was needed for another data block, then the previous access is stored and maintained with the data block so that in the future, if it is again requested and moved to SSD cache 112, the later access may be correctly accounted for in the access consistency metric.

Based on access frequency, the blocks may be sorted in descending order and a cutoff targeted for the SSD storage pool 110 determined. The cutoff may account for a small multiplier of the overall SSD capacity available. For this subset, the dynamic partitioning between cache and tiering functions is derived with an iterative approach starting with heuristics based thresholds for the "variableness" measure. Blocks with steady access history are designated to be tiered and the rest are cached. The access consistency threshold may be iteratively shifted up or down with the general objective of maximizing the hit rate (e.g., SSD hit rate) weighted by the total number of accesses per time period. In this way, blocks with a higher number of accesses are favored over blocks with lower accesses where such blocks have similar hit rates.

Figure 2:
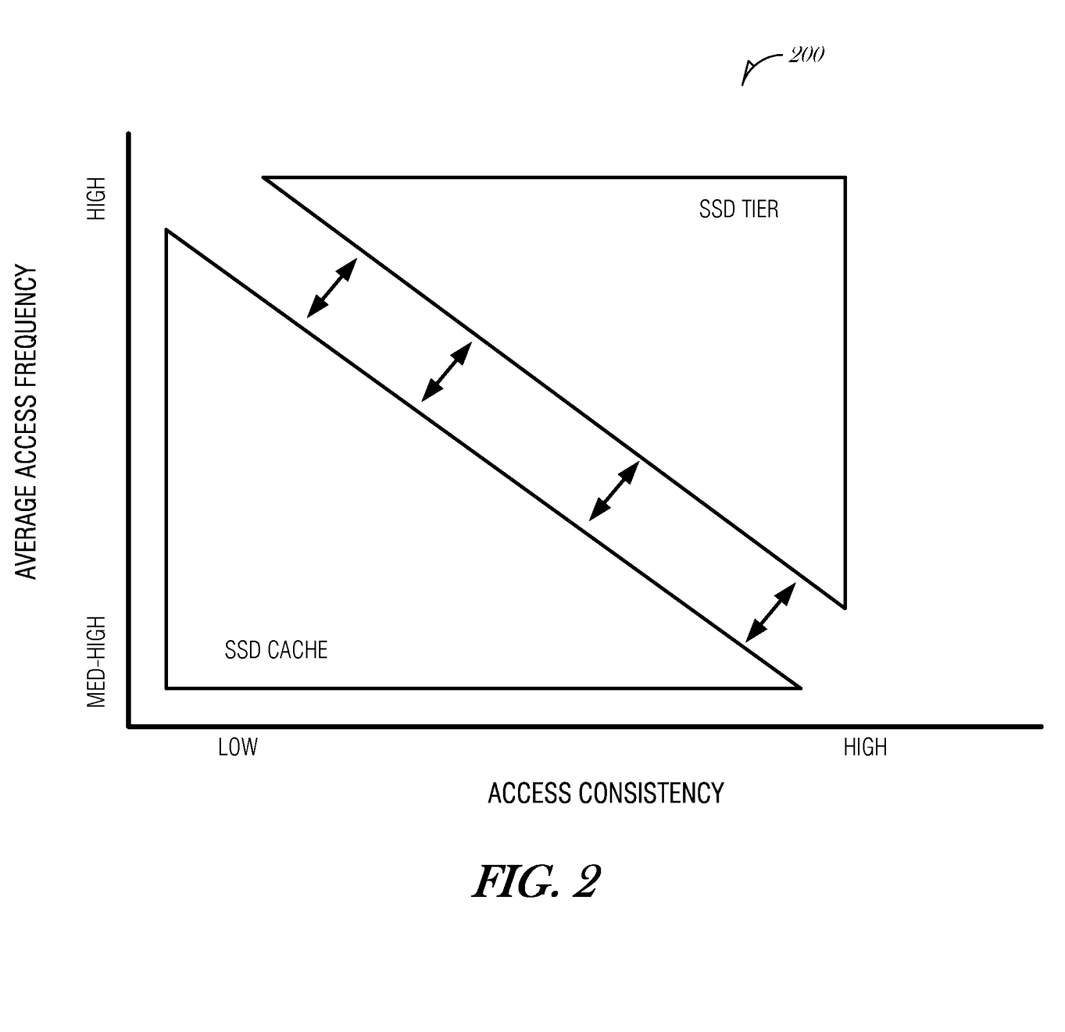
FIG. 2 is a chart illustrating time-varying SSD storage pool partitioning based on data access metrics, according to an embodiment.

FIG. 2 is a chart 200 illustrating time-varying SSD storage pool partitioning based on data access metrics, according to an embodiment. The SSD storage pool 110 may be partitioned between an SSD cache 112 and SSD tier 114. The x-axis of the chart 200 is access consistency of a block and the y-axis of the chart 200 is average access frequency of the block. Note that the low end of the y-axis is medium-high access frequency. This is due to the fact that only blocks that have at least a medium-high access frequency will be stored in SSD storage. Those blocks that have lower access frequency are likely stored in capacity storage (e.g., hard disk tier 116). Blocks that have an access consistency that substantially varies over time are stored in SSD cache 112. Blocks that are used frequently and have a relatively consistent I/O pattern (e.g., a high access consistency) are stored in SSD tier 114. The capacity of SSD storage that is assigned to cache mode or tier mode is determined by the access consistency threshold and the capacity used for either cache or tier may vary over time.

Figure 3:
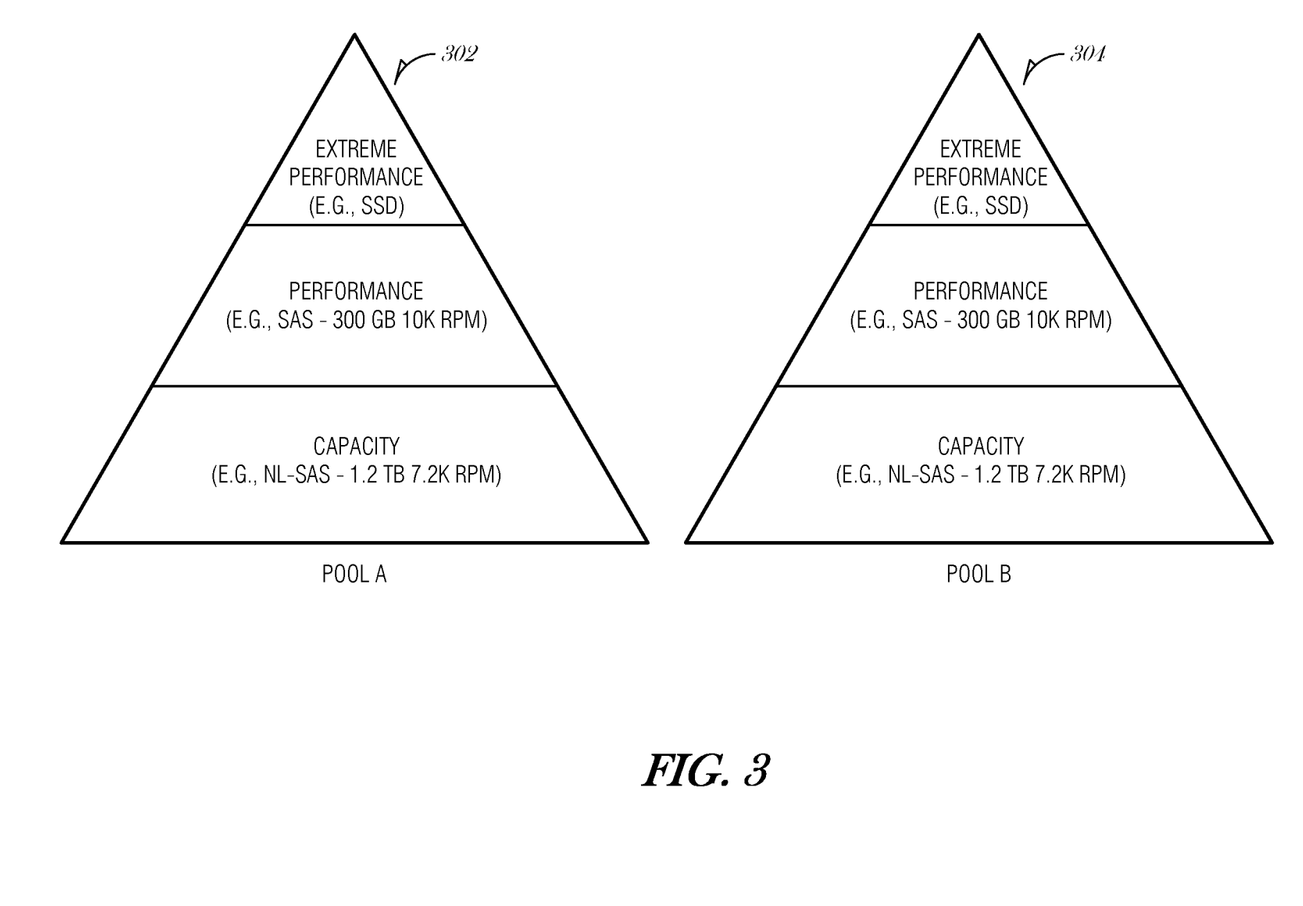
FIG. 3 is a block diagram illustrating multiple storage pools, according to an embodiment.

FIG. 3 is a block diagram illustrating multiple storage pools, according to an embodiment. Each of Pool A 302 and Pool B 304 includes an extreme performance tier, a performance tier, and a capacity tier. As discussed above, the extreme performance tier typically includes SSDs, the performance tier typically includes fast, high-performance, reliable SAS drives, and the capacity tier typically includes lower performance, high-capacity, NL-SAS drives. NL-SAS drives may be SAS drives with lower specifications (e.g., slower spindle speed or a lower mean time between failure (MTBF)). NL-SAS drives may also be other drive types (e.g., SATA) with an interposer or bridge to translate between SAS commands and native drive commands (e.g., SATA commands).

In contrast to conventional SSD cache operations where the SSD cache is shared among pools, in the configuration shown in FIG. 3, each pool (302 and 304) includes its own solid state storage pool to adaptively and dynamically partition into a cache and a tier. By not sharing a logical SSD cache across pools, contention is eliminated and performance of each pool is increased.

In conventional implementations, the pools (302 and 304) are organized by basing the tiers on drive types (e.g., SSD, SAS, NL-SAS). In these conventional implementations, for each tier, a single drive type may be specified by an administrator. For example, when configuring a SAS tier, an administrator may be presented a list of drive types and capacities, such that the administrator may specify 300 GB 15K RPM SAS drives or 600 GB 10K RPM drives or 900 GB 10K drives, but not a mix of these drive types/capacities.

The downside of these types of restrictions is that the cloud storage administrator is forced to grow pools based on automated storage tiering with drive types that were selected initially. To be able to use newer drive types, the cloud storage administrator is forced to start configuring new pools, which may result in fragmentation of storage capacity across a larger number of pools, each of which may have much lower capacity than a single unified storage pool. This storage capacity fragmentation results in multiple inefficiencies that collectively drive a higher overall total cost of ownership and associated competitive concerns.

To overcome these limitations, storage tiers may be designed and implemented based on drive performance metrics instead of just rough device classifications (e.g., SSD, SAS, NL-SAS). In an embodiment, the individual drive capacity and drive IOPS are used together in a composite metric referred to as IOPS Density. IOPS Density is the IOPS divided by capacity. Tiers may be arranged in order of IOPS Density.

An example hierarchy of tiers based on IOPS Density is:

| Top tier | SSD (highest IOPS Density) |
|---|---|
| SAS tiers | 10K RPM - 300 GB |
| | 10K RPM - 600 GB |
| | 10K RPM - 900 GB |
| | 10K RPM - 1.2 TB |
| NL-SAS tiers | 7.2K RPM - 2 TB |
| | 7.2K RPM - 3 TB |
| | 7.2K RPM - 4 TB (lowest IOPS Density) |

Data placement algorithms do not need to be changed in principle—only adapted to accommodate a larger number of tiers. Typically, the approach is to start by populating the highest performing tiers first—up to a specified threshold and then migrating the least active data blocks to the next lower performance storage tier until that fills up to its specified threshold and continue the ripple down effect to the lowest performance tier. This provides the best overall performance by maximizing the I/O traffic to the best performing tiers in the storage pool.

Figure 4:
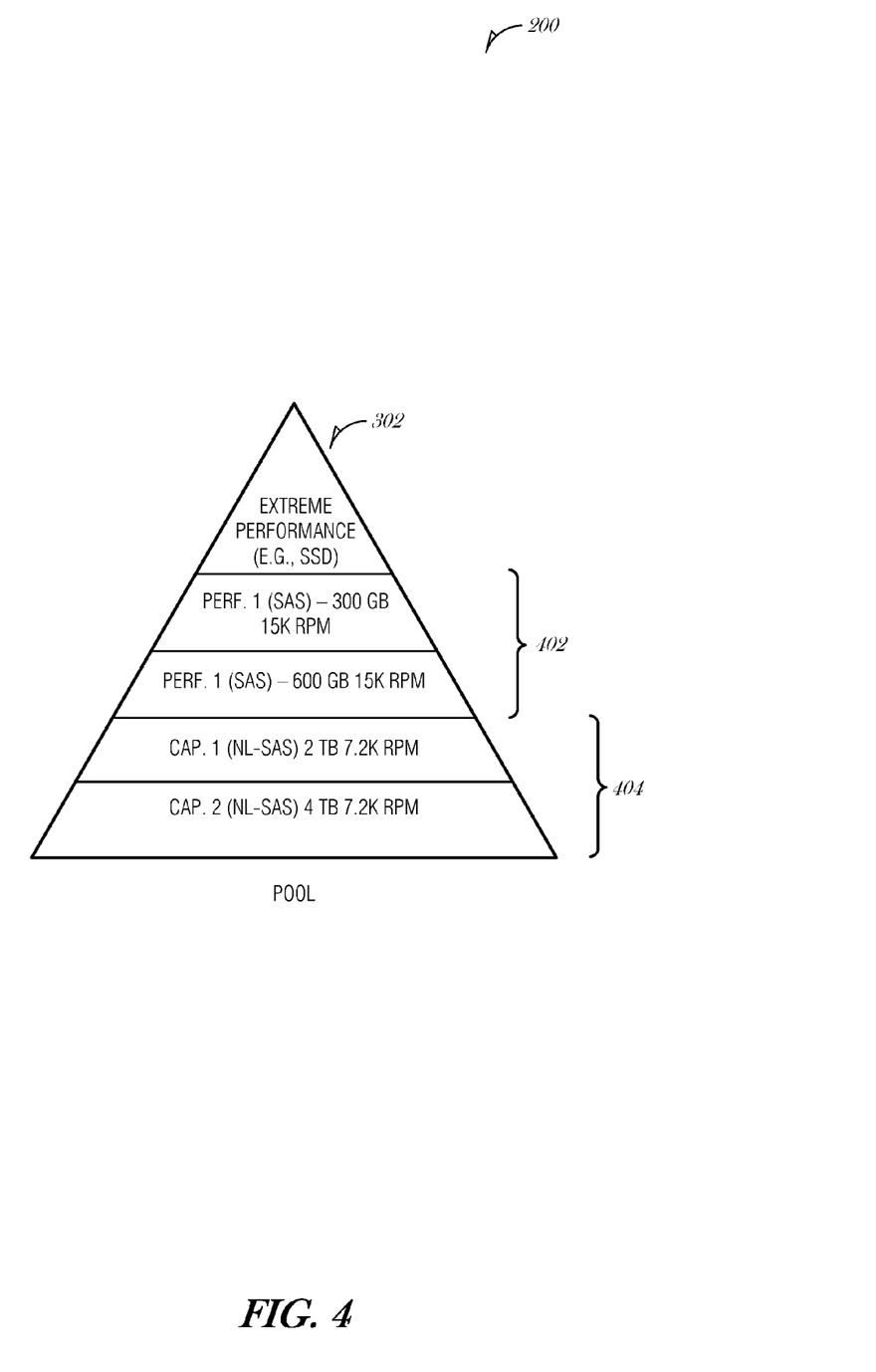
FIG. 4 is a block diagram illustrating a storage pool with a flexible tiering design, according to an embodiment.

FIG. 4 is a block diagram illustrating a storage pool with a flexible tiering design, according to an embodiment. In contrast to the pools illustrated in FIG. 3, the pool illustrated in FIG. 4 includes several sub-tiers within each of the performance tier 402 and the capacity tier 404. The sub-tiers are organized according to IOPS Density. Although only a few sub-tiers are illustrated, it is understood that any number of sub-tiers may be implemented. Further, although only one SSD tier is illustrated, it is understood that additional SSD tiers may be implemented according to the same principles described above. Further, while the base tiers are illustrated (e.g., SSD, SAS, NL-SAS), it is understood that the tier names may be removed and that drives may be organized by IOPS Density and that they may be used as either "performance" or "capacity" drives according to various thresholds based on IOPS Density.

Figure 5:
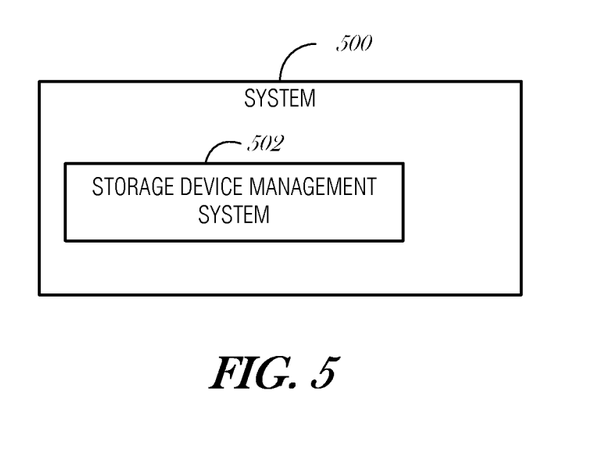
FIG. 5 is a block diagram illustrating a system for managing storage allocation, according to an embodiment.

FIG. 5 is a block diagram illustrating a system 500 for managing storage allocation, according to an embodiment. The system 500 may include a storage device management system 502. The storage device management system 502 may be implemented in full or in part by the cloud storage operating software 106.

The storage device management system 502 may be configured to maintain an access history of a plurality of storage blocks of solid state drives (SSDs) managed by the storage device management system and automatically configure each of a plurality of storage blocks to operate in cache mode or tier mode, where a ratio of storage blocks operating in cache mode and storage blocks operating in tier mode is based on the access history. In an embodiment, the storage device management system 502 is to recurrently perform these operations, such as daily, hourly, every minute, etc.

In an embodiment, to maintain the access history, the storage device management system is to determine an average access frequency of each of the plurality of storage blocks and determine an access consistency of each of the plurality of storage blocks. In a further embodiment, to automatically configure each of the plurality of storage blocks, the storage device management system is to configure storage blocks with a relatively high average access frequency and a relatively high access consistency to operate in tier mode and configure storage blocks with a relatively low average access frequency and a relatively low access consistency to operate in cache mode.

In another embodiment, the storage device management system 502 is configured to sort the plurality of storage blocks based on the access consistency. In a further embodiment, the storage device management system 502 is to identify an access consistency threshold, and to automatically configure each of the plurality of storage blocks, the storage device management system 502 is to configure storage blocks with an access consistency that exceeds the access consistency threshold to operate in tier mode. In a further embodiment, to automatically configure each of the plurality of storage blocks, the storage device management system 502 is to configure storage blocks with an access consistency that does not exceed the access consistency threshold to operate in cache mode.

In an embodiment, the storage device management system 502 is to adjust the access consistency threshold to maximize a hit-rate of the plurality of storage blocks stored on the SSDs.

In an embodiment, the storage device management system 502 is to adjust the access consistency threshold based on a weighted function of the access consistency weighted by the average access frequency of each of the plurality of storage blocks for a time period.

In an embodiment, the access consistency of each of the plurality of storage blocks is a ratio of a standard deviation of accesses and the average access frequency of each respective block of the plurality of storage blocks.

In an embodiment, to determine the access consistency of the plurality of storage blocks, the storage device management system is to use a weighted average of the access consistency of the respective block in the plurality of blocks.

In an embodiment, the SSDs managed by the storage device management system 502 are not shared across device pools. As discussed above, maintaining separate SSD caches per pool may reduce cross-pool contention and increase performance.

In an embodiment, the storage device management system 502 manages a plurality of storage devices organized in a plurality of tiers, and wherein the storage device management system is to identify a new drive to be incorporated into the plurality of storage devices, identify a data transmission metric of the new device, and incorporate the new drive into the plurality of tiers based on the data transmission metric. In a further embodiment, the data transmission metric comprises an input/output operations per second (IOPS) per gigabyte. In an embodiment, the IOPS of the new device is obtained from datasheet information corresponding to the new device. In another embodiment, to obtain the IOPS of the new device, the storage device management system is to monitor the new device during operation in the plurality of storage devices; and measure an average IOPS of the new device based on the monitoring.

In an embodiment, to incorporate the new drive into the plurality of tiers, the storage device management system is to identify a new tier for the new device and incorporate the new tier into the plurality of tiers.

In an embodiment, the plurality of tiers are organized based on data transmission metrics of the plurality of storage devices from faster operation to slower operation. Tiers may be composed of ranges of IOPS Densities to account for minor variations in driver performance. For example, two SAS drives where one is a 2 GB 10K RPM drive with 145 IOPS and another is a 3 GB 15 RPM with a 220 IOPS may be placed into the same tier because the 2 GB drive has an IOPS Density of 72.5 and the 3 GB drive has an IOPS Density of 73.3. Such a tier may be composed of drive with IOPS Densities ranging from 72.0 to 74.0, for example.

Figure 6:
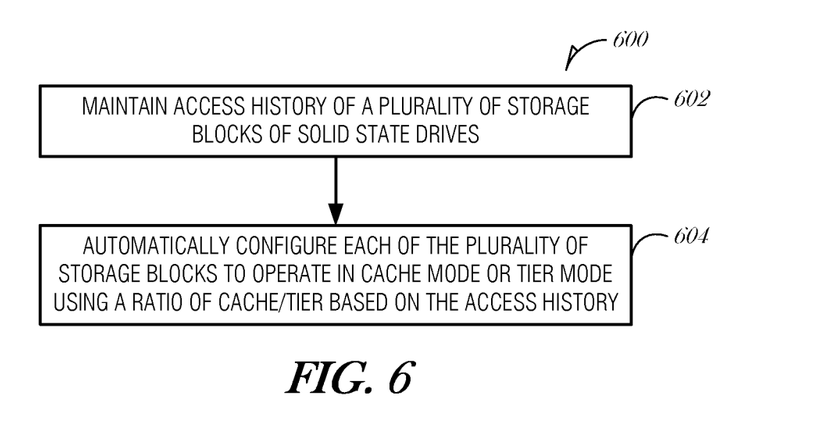
FIG. 6 is a flowchart illustrating a method of managing storage allocation, according to an embodiment.

FIG. 6 is a flowchart illustrating a method 600 of managing storage allocation, according to an embodiment. At block 602, at a storage device management system, an access history of a plurality of storage blocks of solid state drives (SSDs) managed by the storage device management system is maintained. In an embodiment, the method 600 includes recurrently performing the automatic configuration.

In an embodiment, maintaining the access history comprises determining an average access frequency of each of the plurality of storage blocks and determining an access consistency of each of the plurality of storage blocks. In a further embodiment, automatically configuring each of the plurality of storage blocks comprises configuring storage blocks with a relatively high average access frequency and a relatively high access consistency to operate in tier mode and configuring storage blocks with a relatively low average access frequency and a relatively low access consistency to operate in cache mode.

In a further embodiment, the method 600 includes sorting the plurality of storage blocks based on the access consistency. In a further embodiment, the method 600 includes identifying an access consistency threshold and where automatically configuring each of the plurality of storage blocks comprises configuring storage blocks with an access consistency that exceeds the access consistency threshold to operate in tier mode.

At block 604, each of a plurality of storage blocks is automatically configured by the storage device management system, to operate in cache mode or tier mode, where a ratio of storage blocks operating in cache mode and storage blocks operating in tier mode is based on the access history.

In an embodiment, automatically configuring each of the plurality of storage blocks comprises configuring storage blocks with an access consistency that does not exceed the access consistency threshold to operate in cache mode.

In an embodiment, the method 600 includes adjusting the access consistency threshold to maximize a hit-rate of the plurality of storage blocks stored on the SSDs.

In an embodiment, the method 600 includes adjusting the access consistency threshold based on a weighted function of the access consistency weighted by the average access frequency of each of the plurality of storage blocks for a time period.

In an embodiment, the access consistency of each of the plurality of storage blocks is a ratio of a standard deviation of accesses and the average access frequency of each respective block of the plurality of storage blocks.

In an embodiment, determining the access consistency of the plurality of storage blocks comprises using a weighted average of the access consistency of the respective block in the plurality of blocks.

In an embodiment, the SSDs managed by the storage device management system are not shared across device pools.

In an embodiment, the storage device management system manages a plurality of storage devices organized in a plurality of tiers, and the method 600 includes identifying a new drive to be incorporated into the plurality of storage devices, identifying a data transmission metric of the new device, and incorporating the new drive into the plurality of tiers based on the data transmission metric. In a further embodiment, the data transmission metric comprises an input/output operations per second (IOPS) per gigabyte. In an embodiment, the IOPS of the new device is obtained from datasheet information corresponding to the new device. In an embodiment, the IOPS of the new device is obtained by monitoring the new device during operation in the plurality of storage devices and measuring an average IOPS of the new device based on the monitoring. The monitoring may be performed as an initial testing, configuration, or installation procedure when a new device is introduced to a pool.

In an embodiment, incorporating the new drive into the plurality of tiers comprises identifying a new tier for the new device and incorporating the new tier into the plurality of tiers.

In an embodiment, the plurality of tiers are organized based on data transmission metrics of the plurality of storage devices from faster operation to slower operation.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
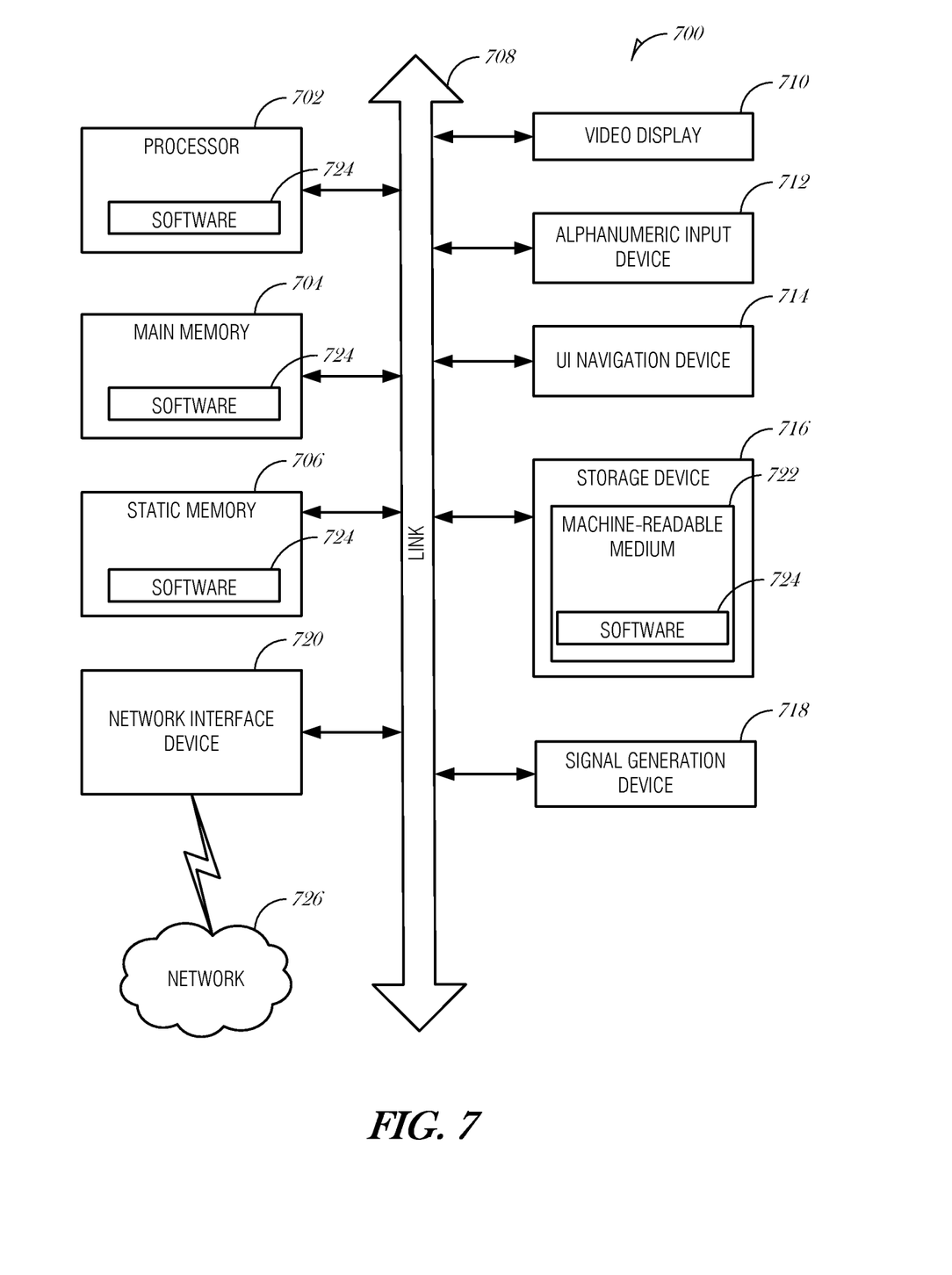
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for managing storage allocation (such as a device, apparatus, or machine) comprising: a storage device management system to: maintain an access history of a plurality of storage blocks of solid state drives (SSDs) managed by the storage device management system; and automatically configure each of a plurality of storage blocks to operate in cache mode or tier mode, wherein a ratio of storage blocks operating in cache mode and storage blocks operating in tier mode is based on the access history.

In Example 2, the subject matter of Example 1 may include, wherein to maintain the access history, the storage device management system is to: determine an average access frequency of each of the plurality of storage blocks; and determine an access consistency of each of the plurality of storage blocks.

In Example 3, the subject matter of any one of Examples 1 to 2 may include, wherein to automatically configure each of the plurality of storage blocks, the storage device management system is to: configure storage blocks with a relatively high average access frequency and a relatively high access consistency to operate in tier mode; and configure storage blocks with a relatively low average access frequency and a relatively low access consistency to operate in cache mode.

In Example 4, the subject matter of any one of Examples 1 to 3 may include, wherein the storage device management system is to sort the plurality of storage blocks based on the access consistency.

In Example 5, the subject matter of any one of Examples 1 to 4 may include, wherein the storage device management system is to identify an access consistency threshold, and to automatically configure each of the plurality of storage blocks, the storage device management system is to configure storage blocks with an access consistency that exceeds the access consistency threshold to operate in tier mode.

In Example 6, the subject matter of any one of Examples 1 to 5 may include, wherein to automatically configure each of the plurality of storage blocks, the storage device management system is to configure storage blocks with an access consistency that does not exceed the access consistency threshold to operate in cache mode.

In Example 7, the subject matter of any one of Examples 1 to 6 may include, wherein the storage device management system is to adjust the access consistency threshold to maximize a hit-rate of the plurality of storage blocks stored on the SSDs.

In Example 8, the subject matter of any one of Examples 1 to 7 may include, wherein the storage device management system is to adjust the access consistency threshold based on a weighted function of the access consistency weighted by the average access frequency of each of the plurality of storage blocks for a time period.

In Example 9, the subject matter of any one of Examples 1 to 8 may include, wherein the access consistency of each of the plurality of storage blocks is a ratio of a standard deviation of accesses and the average access frequency of each respective block of the plurality of storage blocks.

In Example 10, the subject matter of any one of Examples 1 to 9 may include, wherein to determine the access consistency of the plurality of storage blocks, the storage device management system is to use a weighted average of the access consistency of the respective block in the plurality of blocks.

In Example 11, the subject matter of any one of Examples 1 to 10 may include, wherein the storage device management system is to recurrently perform the automatic configuring of claim 1.

In Example 12, the subject matter of any one of Examples 1 to 11 may include, wherein the SSDs managed by the storage device management system are not shared across device pools.

In Example 13, the subject matter of any one of Examples 1 to 12 may include, wherein the storage device management system manages a plurality of storage devices organized in a plurality of tiers, and wherein the storage device management system is to: identify a new drive to be incorporated into the plurality of storage devices; identify a data transmission metric of the new device; and incorporate the new drive into the plurality of tiers based on the data transmission metric.

In Example 14, the subject matter of any one of Examples 1 to 13 may include, wherein the data transmission metric comprises an input/output operations per second (IOPS) per gigabyte.

In Example 15, the subject matter of any one of Examples 1 to 14 may include, wherein the IOPS of the new device is obtained from datasheet information corresponding to the new device.

In Example 16, the subject matter of any one of Examples 1 to 15 may include, wherein to obtain the IOPS of the new device, the storage device management system is to: monitor the new device during operation in the plurality of storage devices; and measure an average IOPS of the new device based on the monitoring.

In Example 17, the subject matter of any one of Examples 1 to 16 may include, wherein to incorporate the new drive into the plurality of tiers, the storage device management system is to: identify a new tier for the new device; and incorporate the new tier into the plurality of tiers.

In Example 18, the subject matter of any one of Examples 1 to 17 may include, wherein the plurality of tiers are organized based on data transmission metrics of the plurality of storage devices from faster operation to slower operation.

Example 19 includes subject matter for managing storage allocation (such as a method, means for performing acts, machine readable medium including instructions that when performed by a machine cause the machine to performs acts, or an apparatus to perform) comprising: maintaining, at a storage device management system, an access history of a plurality of storage blocks of solid state drives (SSDs) managed by the storage device management system; and automatically configuring, by the storage device management system, each of a plurality of storage blocks to operate in cache mode or tier mode, wherein a ratio of storage blocks operating in cache mode and storage blocks operating in tier mode is based on the access history.

In Example 20, the subject matter of Example 19 may include, wherein maintaining the access history comprises: determining an average access frequency of each of the plurality of storage blocks; and determining an access consistency of each of the plurality of storage blocks.

In Example 21, the subject matter of any one of Examples 19 to 20 may include, wherein automatically configuring each of the plurality of storage blocks comprises: configuring storage blocks with a relatively high average access frequency and a relatively high access consistency to operate in tier mode; and configuring storage blocks with a relatively low average access frequency and a relatively low access consistency to operate in cache mode.

In Example 22, the subject matter of any one of Examples 19 to 21 may include, sorting the plurality of storage blocks based on the access consistency.

In Example 23, the subject matter of any one of Examples 19 to 22 may include, identifying an access consistency threshold, and wherein automatically configuring each of the plurality of storage blocks comprises configuring storage blocks with an access consistency that exceeds the access consistency threshold to operate in tier mode.

In Example 24, the subject matter of any one of Examples 19 to 23 may include, wherein automatically configuring each of the plurality of storage blocks comprises configuring storage blocks with an access consistency that does not exceed the access consistency threshold to operate in cache mode.

In Example 25, the subject matter of any one of Examples 19 to 24 may include, adjusting the access consistency threshold to maximize a hit-rate of the plurality of storage blocks stored on the SSDs.

In Example 26, the subject matter of any one of Examples 19 to 25 may include, adjusting the access consistency threshold based on a weighted function of the access consistency weighted by the average access frequency of each of the plurality of storage blocks for a time period.

In Example 27, the subject matter of any one of Examples 19 to 26 may include, wherein the access consistency of each of the plurality of storage blocks is a ratio of a standard deviation of accesses and the average access frequency of each respective block of the plurality of storage blocks.

In Example 28, the subject matter of any one of Examples 19 to 27 may include, wherein determining the access consistency of the plurality of storage blocks comprises using a weighted average of the access consistency of the respective block in the plurality of blocks.

In Example 29, the subject matter of any one of Examples 19 to 28 may include, recurrently performing the automatic configuring of claim 19.

In Example 30, the subject matter of any one of Examples 19 to 29 may include, wherein the SSDs managed by the storage device management system are not shared across device pools.

In Example 31, the subject matter of any one of Examples 19 to 30 may include, wherein the storage device management system manages a plurality of storage devices organized in a plurality of tiers, and wherein the method further comprises: identifying a new drive to be incorporated into the plurality of storage devices; identifying a data transmission metric of the new device; and incorporating the new drive into the plurality of tiers based on the data transmission metric.

In Example 32, the subject matter of any one of Examples 19 to 31 may include, wherein the data transmission metric comprises an input/output operations per second (IOPS) per gigabyte.

In Example 33, the subject matter of any one of Examples 19 to 32 may include, wherein the IOPS of the new device is obtained from datasheet information corresponding to the new device.

In Example 34, the subject matter of any one of Examples 19 to 33 may include, wherein the IOPS of the new device is obtained by: monitoring the new device during operation in the plurality of storage devices; and measuring an average IOPS of the new device based on the monitoring.

In Example 35, the subject matter of any one of Examples 19 to 34 may include, wherein incorporating the new drive into the plurality of tiers comprises: identifying a new tier for the new device; and incorporating the new tier into the plurality of tiers.

In Example 36, the subject matter of any one of Examples 19 to 35 may include, wherein the plurality of tiers are organized based on data transmission metrics of the plurality of storage devices from faster operation to slower operation.

Example 37 includes at least one machine-readable medium including instructions, which when executed by a machine, cause the machine to perform operations of any of the Examples 19-36.

Example 38 includes an apparatus comprising means for performing any of the Examples 19-36.

Example 39 includes subject matter for managing storage allocation (such as a device, apparatus, or machine) comprising: means for maintaining, at a storage device management system, an access history of a plurality of storage blocks of solid state drives (SSDs) managed by the storage device management system; and means for automatically configuring, by the storage device management system, each of a plurality of storage blocks to operate in cache mode or tier mode, wherein a ratio of storage blocks operating in cache mode and storage blocks operating in tier mode is based on the access history.

In Example 40, the subject matter of Example 39 may include, wherein the means for maintaining the access history comprise: means for determining an average access frequency of each of the plurality of storage blocks; and means for determining an access consistency of each of the plurality of storage blocks.

In Example 41, the subject matter of any one of Examples 39 to 40 may include, wherein the means for automatically configuring each of the plurality of storage blocks comprise: means for configuring storage blocks with a relatively high average access frequency and a relatively high access consistency to operate in tier mode; and means for configuring storage blocks with a relatively low average access frequency and a relatively low access consistency to operate in cache mode.

In Example 42, the subject matter of any one of Examples 39 to 41 may include, means for sorting the plurality of storage blocks based on the access consistency.

In Example 43, the subject matter of any one of Examples 39 to 42 may include, means for identifying an access consistency threshold, and wherein the means for automatically configuring each of the plurality of storage blocks comprise means for configuring storage blocks with an access consistency that exceeds the access consistency threshold to operate in tier mode.

In Example 44, the subject matter of any one of Examples 39 to 43 may include, wherein the means for automatically configuring each of the plurality of storage blocks comprise means for configuring storage blocks with an access consistency that does not exceed the access consistency threshold to operate in cache mode.

In Example 45, the subject matter of any one of Examples 39 to 44 may include, means for adjusting the access consistency threshold to maximize a hit-rate of the plurality of storage blocks stored on the SSDs.

In Example 46, the subject matter of any one of Examples 39 to 45 may include, means for adjusting the access consistency threshold based on a weighted function of the access consistency weighted by the average access frequency of each of the plurality of storage blocks for a time period.

In Example 47, the subject matter of any one of Examples 39 to 46 may include, wherein the access consistency of each of the plurality of storage blocks is a ratio of a standard deviation of accesses and the average access frequency of each respective block of the plurality of storage blocks.

In Example 48, the subject matter of any one of Examples 39 to 47 may include, wherein the means for determining the access consistency of the plurality of storage blocks comprise means for using a weighted average of the access consistency of the respective block in the plurality of blocks.

In Example 49, the subject matter of any one of Examples 39 to 48 may include, means for recurrently performing the automatic configuring of claim 39.

In Example 50, the subject matter of any one of Examples 39 to 49 may include, wherein the SSDs managed by the storage device management system are not shared across device pools.

In Example 51, the subject matter of any one of Examples 39 to 50 may include, wherein the storage device management system manages a plurality of storage devices organized in a plurality of tiers, and wherein the apparatus further comprises: means for identifying a new drive to be incorporated into the plurality of storage devices; means for identifying a data transmission metric of the new device; and means for incorporating the new drive into the plurality of tiers based on the data transmission metric.

In Example 52, the subject matter of any one of Examples 39 to 51 may include, wherein the data transmission metric comprises an input/output operations per second (IOPS) per gigabyte.

In Example 53, the subject matter of any one of Examples 39 to 52 may include, wherein the IOPS of the new device is obtained from datasheet information corresponding to the new device.

In Example 54, the subject matter of any one of Examples 39 to 53 may include, wherein the IOPS of the new device is obtained by: monitoring the new device during operation in the plurality of storage devices; and measuring an average IOPS of the new device based on the monitoring.

In Example 55, the subject matter of any one of Examples 39 to 54 may include, wherein the means for incorporating the new drive into the plurality of tiers comprise: means for identifying a new tier for the new device; and means for incorporating the new tier into the plurality of tiers.

In Example 56, the subject matter of any one of Examples 39 to 55 may include, wherein the plurality of tiers are organized based on data transmission metrics of the plurality of storage devices from faster operation to slower operation.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing storage allocation, the system comprising:
    a storage device management system to:
        maintain an access history of a plurality of storage blocks of solid state drives (SSDs) managed by the storage device management system; and
        automatically configure each of a plurality of storage blocks to operate in cache mode or tier mode, wherein a ratio of storage blocks operating in cache mode and storage blocks operating in tier mode is based on the access history;
    wherein to maintain the access history, the storage device management system is to:
        determine an average access frequency of each of the plurality of storage blocks; and
        determine an access consistency of each of the plurality of storage blocks; and
    wherein to automatically configure each of the plurality of storage blocks, the storage device management system is to:
        configure storage blocks with a relatively high average access frequency and a relatively high access consistency to operate in tier mode; and
        configure storage blocks with a relatively low average access frequency and a relatively low access consistency to operate in cache mode.

2. The system of claim 1, wherein the storage device management system is to sort the plurality of storage blocks based on the access consistency.

3. The system of claim 2, wherein the storage device management system is to identify an access consistency threshold, and to automatically configure each of the plurality of storage blocks, the storage device management system is to configure storage blocks with an access consistency that exceeds the access consistency threshold to operate in tier mode.

4. The system of claim 3, wherein to automatically configure each of the plurality of storage blocks, the storage device management system is to configure storage blocks with an access consistency that does not exceed the access consistency threshold to operate in cache mode.

5. The system of claim 3, wherein the storage device management system is to adjust the access consistency threshold to maximize a hit-rate of the plurality of storage blocks stored on the SSDs.

6. The system of claim 3, wherein the storage device management system is to adjust the access consistency threshold based on a weighted function of the access consistency weighted by the average access frequency of each of the plurality of storage blocks for a time period.

7. The system of claim 1, wherein the access consistency of each of the plurality of storage blocks is a ratio of a standard deviation of accesses and the average access frequency of each respective block of the plurality of storage blocks.

8. The system of claim 1, wherein to determine the access consistency of the plurality of storage blocks, the storage device management system is to use a weighted average of the access consistency of the respective block in the plurality of blocks.

9. The system of claim 1, wherein the SSDs managed by the storage device management system are not shared across device pools.

10. The system of claim 1, wherein the storage device management system manages a plurality of storage devices organized in a plurality of tiers, and wherein the storage device management system is to:
identify a new drive to be incorporated into the plurality of storage devices;
identify a data transmission metric of the new device; and
incorporate the new drive into the plurality of tiers based on the data transmission metric.

11. The system of claim 10, wherein the data transmission metric comprises an input/output operations per second (IOPS) per gigabyte.

12. The system of claim 11, wherein the IOPS of the new device is obtained from datasheet information corresponding to the new device.

13. A method of managing storage allocation, the method comprising:
maintaining, at a storage device management system, an access history of a plurality of storage blocks of solid state drives (SSDs) managed by the storage device management system; and
automatically configuring, by the storage device management system, each of a plurality of storage blocks to operate in cache mode or tier mode, wherein a ratio of storage blocks operating in cache mode and storage blocks operating in tier mode is based on the access history;
wherein maintaining the access history comprises:
determining an average access frequency of each of the plurality of storage blocks; and
determining an access consistency of each of the plurality of storage blocks; and
wherein automatically configuring each of the plurality of storage blocks comprises:
configuring storage blocks with a relatively high average access frequency and a relatively high access consistency to operate in tier mode; and
configuring storage blocks with a relatively low average access frequency and a relatively low access consistency to operate in cache mode.

14. The method of claim 13, further comprising sorting the plurality of storage blocks based on the access consistency.

15. The method of claim 13, further comprising identifying an access consistency threshold, and
wherein automatically configuring each of the plurality of storage blocks comprises configuring storage blocks with an access consistency that exceeds the access consistency threshold to operate in tier mode.

16. The method of claim 15, wherein automatically configuring each of the plurality of storage blocks comprises configuring storage blocks with an access consistency that does not exceed the access consistency threshold to operate in cache mode.

17. The method of claim 15, further comprising:
adjusting the access consistency threshold to maximize a hit-rate of the plurality of storage blocks stored on the SSDs.

18. The method of claim 15, further comprising:
adjusting the access consistency threshold based on a weighted function of the access consistency weighted by the average access frequency of each of the plurality of storage blocks for a time period.

19. The method of claim 13, wherein the access consistency of each of the plurality of storage blocks is a ratio of a standard deviation of accesses and the average access frequency of each respective block of the plurality of storage blocks.

20. The method of claim 13, wherein determining the access consistency of the plurality of storage blocks comprises using a weighted average of the access consistency of the respective block in the plurality of blocks.

21. At least one machine-readable medium including instructions, which when executed by a machine, cause the machine to:
maintain an access history of a plurality of storage blocks of solid state drives (SSDs) managed by the storage device management system; and
automatically configure each of a plurality of storage blocks to operate in cache mode or tier mode, wherein a ratio of storage blocks operating in cache mode and storage blocks operating in tier mode is based on the access history;
wherein the instructions to maintain the access history comprises instructions to:
determine an average access frequency of each of the plurality of storage blocks; and
determine an access consistency of each of the plurality of storage blocks; and
wherein the instructions to automatically configure each of the plurality of storage blocks comprises instructions to:
configure storage blocks with a relatively high average access frequency and a relatively high access consistency to operate in tier mode; and configure storage blocks with a relatively low average access frequency and a relatively low access consistency to operate in cache mode.

22. The at least one machine-readable medium of claim 21, further comprising instructions to sort the plurality of storage blocks based on the access consistency.

23. The at least one machine-readable medium of claim 22, further comprising instructions to identify an access consistency threshold, and wherein the instructions to automatically configure each of the plurality of storage blocks comprise instructions to configure storage blocks with an access consistency that exceeds the access consistency threshold to operate in tier mode.

24. The at least one machine-readable medium of claim 21, wherein the access consistency of each of the plurality of storage blocks is a ratio of a standard deviation of accesses and the average access frequency of each respective block of the plurality of storage blocks.

25. The at least one machine-readable medium of claim 21, wherein the instructions to determine the access consistency of the plurality of storage blocks comprise instructions to use a weighted average of the access consistency of the respective block in the plurality of blocks.

\* \* \* \* \*